United States Patent [19]
Akagawa et al.

[11] Patent Number: 5,923,685
[45] Date of Patent: Jul. 13, 1999

[54] WAVELENGTH SELECTABLE LASER OSCILLATOR IN WAVELENGTH TUNABLE LASER

[75] Inventors: Kazuyuki Akagawa; Satoshi Wada; Hideo Tashiro, all of Miyagi, Japan

[73] Assignee: Rikagaku Kenkyusho, Saitama, Japan

[21] Appl. No.: 08/848,162

[22] Filed: Apr. 29, 1997

[30] Foreign Application Priority Data

Apr. 30, 1996 [JP] Japan .................................. 8-132853

[51] Int. Cl.$^6$ ............................................. H01S 3/117
[52] U.S. Cl. ............................... 372/13; 372/21; 372/29; 372/32; 372/98; 372/105; 372/106
[58] Field of Search .................................... 372/12, 13, 9, 372/21, 22, 23, 26, 27, 69, 70, 71, 32, 31, 29, 92, 98, 99, 105, 106

[56] References Cited

U.S. PATENT DOCUMENTS

| | | | |
|---|---|---|---|
| 3,828,276 | 8/1974 | Cohen .................................... | 372/13 X |
| 4,945,539 | 7/1990 | Bagshaw et al. ......................... | 372/13 |
| 5,268,912 | 12/1993 | Tatsuno et al. .......................... | 372/22 |
| 5,452,314 | 9/1995 | Aronson .................................. | 372/20 |
| 5,521,930 | 5/1996 | Suni et al. .............................. | 372/13 |
| 5,724,373 | 3/1998 | Chang ..................................... | 372/20 |

OTHER PUBLICATIONS

P.I. Richter, et al., *A cw dye laser tuned by an acousto–optic filter*, Optics Communications, vol. 84, Nos. 3, 4, Jul. 15, 1991.

James L. Lambert, *Acousto–optical Filter Can Rapidly Tune Solid–State Lasers*, NTIS Tech Notes, National Aeronautics and Space Administration, Oct., 1991.

E. Schweicher et al., *Acousto–Optical Signal Processing and Integrated Optics*, Revue HF Tijdschrift, vol. 14, Nos. 3–4, ISSN 0035–3248, pp. 88–122 (1988).

S. Wada et al., *Electronically tuned Ti:sapphire laser*, Optics Letters, vol. 21, No. 10, ISSN 0146–9592, pp. 731–733, May 15, 1996.

"Electronic Tuning of a Dye Laser Using the Acousto–Optic Filter" by D.J. Taylor et al., *Applied Physics Letters,* vol. 19, No. 8, pp. 269–271, Oct. 15, 1971.

"Widely Tunable 90° Phase–Matched KTP Parametric Osillator" by K. Kato et al., *Optics Letters,* vol. 17, No. 3, pp. 178–179, Feb. 1, 1992.

*Primary Examiner*—Brian Healy
*Attorney, Agent, or Firm*—Birch, Stewart, Kolasch & Birch, LLP

[57] ABSTRACT

An object of the present invention is to provide a wavelength selectable laser oscillator in wavelength tunable laser by which high-speed tuning of wavelength can be achieved while utilizing continuous-wave laser beam as the excited laser beam. The wavelength selectable laser oscillator in wavelength tunable laser comprises a laser resonator composed of opposed mirrors each having a prescribed reflectivity on the outgoing side and a total reflection mirror which does not transmit light, but reflects the light; a wavelength tunable laser medium disposed in the laser resonator and capable of laser oscillation in a wavelength zone of a prescribed range; an acousto-optical crystal disposed in the laser oscillator and to which is inputted the outgoing light from the wavelength tunable laser medium; an acoustic wave inputting means mounted on the acousto-optical crystal and for inputting an acoustic wave to the acousto-optical crystal; and a continuous-wave laser for inputting excited laser beam into the laser resonator; the laser beam outputted from the mirrors on the outgoing side being utilized as the outgoing laser beam from the laser resonator.

40 Claims, 6 Drawing Sheets

WAVELENGTH SELECTABLE LASER OSCILLATOR IN WAVELENGTH TUNABLE LASER

BACKGROUND OF THE INVENTION

1. Field of the Invention

The present invention relates to a wavelength selectable laser oscillator in a wavelength tunable laser, and more particularly to a wavelength selectable laser oscillator in a wavelength tunable laser wherein a continuous-wave laser (CW-laser) is utilized as the excited laser source, and the continuous-wave laser beam is inputted to a laser resonator as the excited laser beam.

2. Description of the Related Art

As a wavelength tunable laser wherein a CW-laser is utilized as the excited laser beam, and the continuous-wave laser beam is inputted to a laser resonator as the excited laser beam, for example, a CW-laser excited titanium-sapphire ($Ti:Al_2O_3$) laser has heretofore been known.

However, since a continuous-wave laser beam is used as the excited laser beam in the CW-laser excited titanium-sapphire laser, there have been such problems in that laser oscillation is not attained, unless the loss in the laser resonator is made extremely small, because power of the excited laser beam is low, and that even if the laser oscillation is attained, the wavelength tuning speed is very slow.

Object and Summary of the Invention

The present invention has been made in view of the problems as described above involved in the prior art. Accordingly, an object of the present invention is to provide a wavelength selectable laser oscillator in wavelength tunable laser by which wavelength tuning can be carried out at high speed in spite of utilizing continuous-wave laser beam as the excited laser beam.

In order to attain the above described object, the wavelength selectable laser oscillator in a wavelength tunable laser according to the present invention includes a laser resonator composed of opposed mirrors each having a prescribed reflectivity on the outgoing side and a total reflection mirror which does not transmit light, but reflects light; a wavelength tunable laser medium disposed in the aforesaid laser resonator and capable of laser oscillation in a wavelength zone of a prescribed range; an acousto-optical crystal disposed in the aforesaid laser oscillator and to which is inputted the outgoing light from the aforesaid wavelength tunable laser medium; an acoustic wave inputting means mounted on the aforesaid acousto-optical crystal and for inputting an acoustic wave to the aforesaid acousto-optical crystal; and a continuous-wave laser for inputting excited laser beam into the aforesaid laser resonator; the laser beam outputted from the aforesaid mirrors on the outgoing side being utilized as the outgoing laser beam from the aforesaid laser resonator.

Furthermore, the wavelength selectable laser oscillator in a wavelength tunable laser according to the present invention includes by comprising a laser resonator composed of opposed total reflection mirrors each of which does not transmit light, but reflects light; a wavelength tunable laser medium disposed in the aforesaid laser resonator and capable of laser oscillation in a wavelength zone of a prescribed range; an acousto-optical crystal disposed in the aforesaid laser oscillator and to which is inputted the outgoing light from the aforesaid wavelength tunable laser medium; an acoustic wave inputting means mounted on the aforesaid acousto-optical crystal and for inputting an acoustic wave to the aforesaid acousto-optical crystal; and a continuous-wave laser for inputting excited laser beam into the aforesaid laser resonator; the non-diffracted light outputted from the aforesaid acousto-optical crystal being utilized as the outgoing laser beam from the aforesaid laser resonator.

Moreover, the wavelength selectable laser oscillator in wavelength tunable laser according to the present invention may be further provided with an optical element which is disposed in the aforesaid laser resonator, and for correcting dispersion of the diffracted light outputted from the aforesaid acousto-optical crystal.

In this case, the aforesaid continuous-wave laser may be composed of a continuous-wave solid state laser, a continuous-wave semiconductor laser, a continuous-wave Ar ion-laser, second higher harmonics of a continuous-wave Nd solid state laser or the like.

Further, the aforesaid laser resonator may be composed in the form of a laser resonator of Z-holding type, or a laser resonator of X-holding type.

On one hand, the aforesaid wavelength tunable laser medium may be arranged in such that the incident end surface thereof has been Brewster-cut, and the aforesaid incident end surface is disposed with respect to the optical path inside the aforesaid laser resonator at a Brewster angle.

Moreover, the aforesaid wavelength tunable laser medium may be arranged in such that a non-reflecting coating has been applied to the incident end surface thereof, and the aforesaid incident end surface is disposed vertically with respect to the optical path inside the aforesaid laser resonator.

Still further, one of the opposed mirrors composed of the aforesaid laser resonator may be replaced by a specific coating formed on the end surface of the aforesaid wavelength tunable laser medium.

Accordingly, the wavelength selectable laser oscillator in wavelength tunable laser according to the present invention is arranged in such that the outgoing light from the wavelength tunable laser medium is inputted to the acousto-optical crystal, and when an acoustic wave is inputted the aforesaid acousto-optical crystal by the acoustic wave inputting means, a wavelength of the outgoing light from the wavelength tunable laser medium is selected, so that it becomes possible to conduct tuning of wavelength at high speed in case of laser oscillation, whereby high-speed and random wavelength selection of the outgoing laser beam from the wavelength selectable laser oscillator in wavelength tunable laser becomes possible, and as a result, speed-up of a wavelength tuning speed of the outgoing laser beam can be achieved.

In these circumstances, the selection of wavelength for the wavelength selectable laser oscillator in wavelength tunable laser according to the present invention has been applied as a result of paying its attention to the fact that when an acoustic wave is allowed to generate in an acousto-optical crystal having birefrigent property such as $TeO_2$ crystal and the like, the polarizing plane of diffracted light having a specified wavelength in response to a frequency of the aforesaid acoustic wave among the light rays inputted to the aforesaid crystal comes to be orthogonal to the polarizing plane of non-diffracted light, besides an outgoing angle of the aforesaid diffracted light declines with respect to an outgoing angle of the non-diffracted light so as to differ remarkably therefrom.

Figure 1:
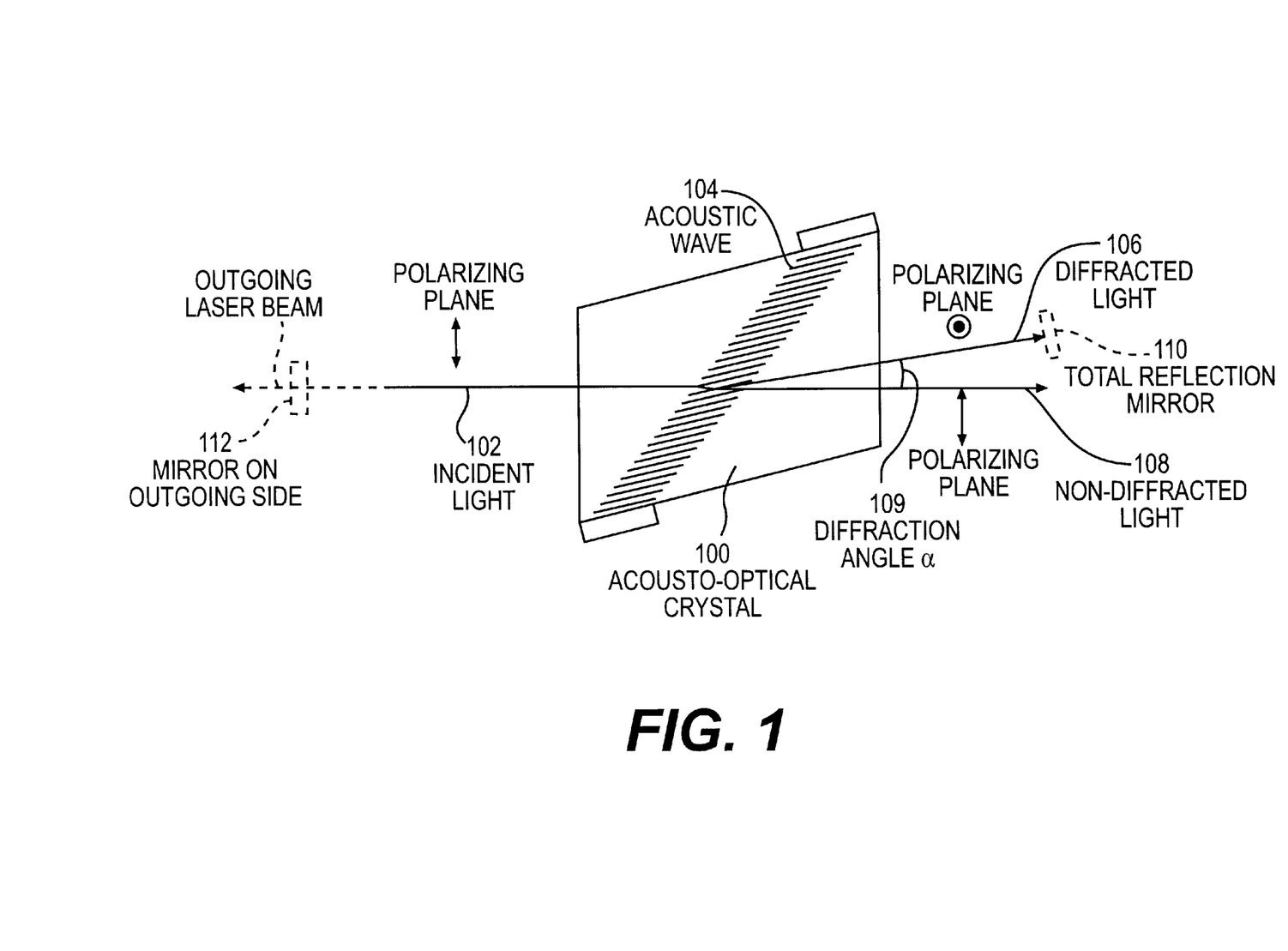
FIG. 1 is a conceptual diagram illustrating a wavelength selecting action utilizing a diffraction function of light having a specified wavelength by means of acoustic wave.

FIG. 1 is a conceptual diagram illustrating a wavelength selecting action utilizing a polarizing action of light having a specified wavelength by means of acoustic wave wherein incident light having wavelength $\lambda$ i and angular frequency $\omega$ is i inputted to an acousto-optical crystal 100 having birefringent property. In this case, when acoustic wave 104 having frequency $\omega$ a is applied into the acousto-optical crystal 100, diffracted light 106 is obtained.

With respect to the diffracted light 106 which is a light ray component diffracted in the above described acousto-optical crystal 100, when a total reflection mirror 110 and a mirror having a prescribed transmittivity on the outgoing side 112 are disposed, a laser resonator is constituted in which the diffracted light reciprocates between the total reflection mirror 110 and the mirror on the outgoing side 112.

In this case, a wavelength of the diffracted light 106 is determined by a frequency of the acoustic wave 104 generated in the acousto-optical crystal 100. Accordingly, for instance, a piezoelectric element driven by an RF power source is attached to the acousto-optical crystal 100, and the piezoelectric element is driven by the RF power source to cause strain in this piezoelectric element, whereby the acoustic wave 104 having a frequency in response to the strain is inputted to the acousto-optical crystal 100, so that tuning control of laser wavelength becomes possible by controlling the frequency of the RF power source.

On the other hand, diffraction efficiency to the diffracted light 106 is decided by the intensity of acoustic wave, so that when input power of the RF power source is controlled, it becomes possible to control loss of the laser resonator, and further to control variably the laser output.

However, since a diffraction angle $\alpha$ 109 is not perfectly constant with respect to a wavelength of the diffracted light, a range of wavelength within which a laser resonator can be constituted is narrow. Thus, an angle for disposing the total reflection mirror 110 must be adjusted step by step for oscillating laser within a wide region, so that there is such a fear that the adjusting operation therefore becomes complicated from practical point of view. For this reason, it is necessary for correcting deflections of the diffraction angle $\alpha$ 109 by any means to widen the range of tunable wavelength without changing the angle of the total reflection mirror 110 disposed.

As a means for correcting the deflections of the diffraction angle $\alpha$ 109, for example, there is the one wherein an optical element which disperses wavelength of light such as a triangular prism or the like may be employed to set the same in such that light rays having a deflection angle $\Delta\alpha$ defined by wavelengths $\lambda 1$ and $\lambda 2$ advance substantially parallelly after passing through the triangular prism. As a result, it becomes possible to always vertically input the diffracted light 106 with respect to the total reflection mirror 110, whereby a laser resonator used for a wide wavelength zone can be constituted.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The manners of practice of the wavelength selectable laser oscillator in wavelength tunable laser according to the present invention will be described in detail hereinafter in conjunction with the accompanying drawings.

Figure 2:
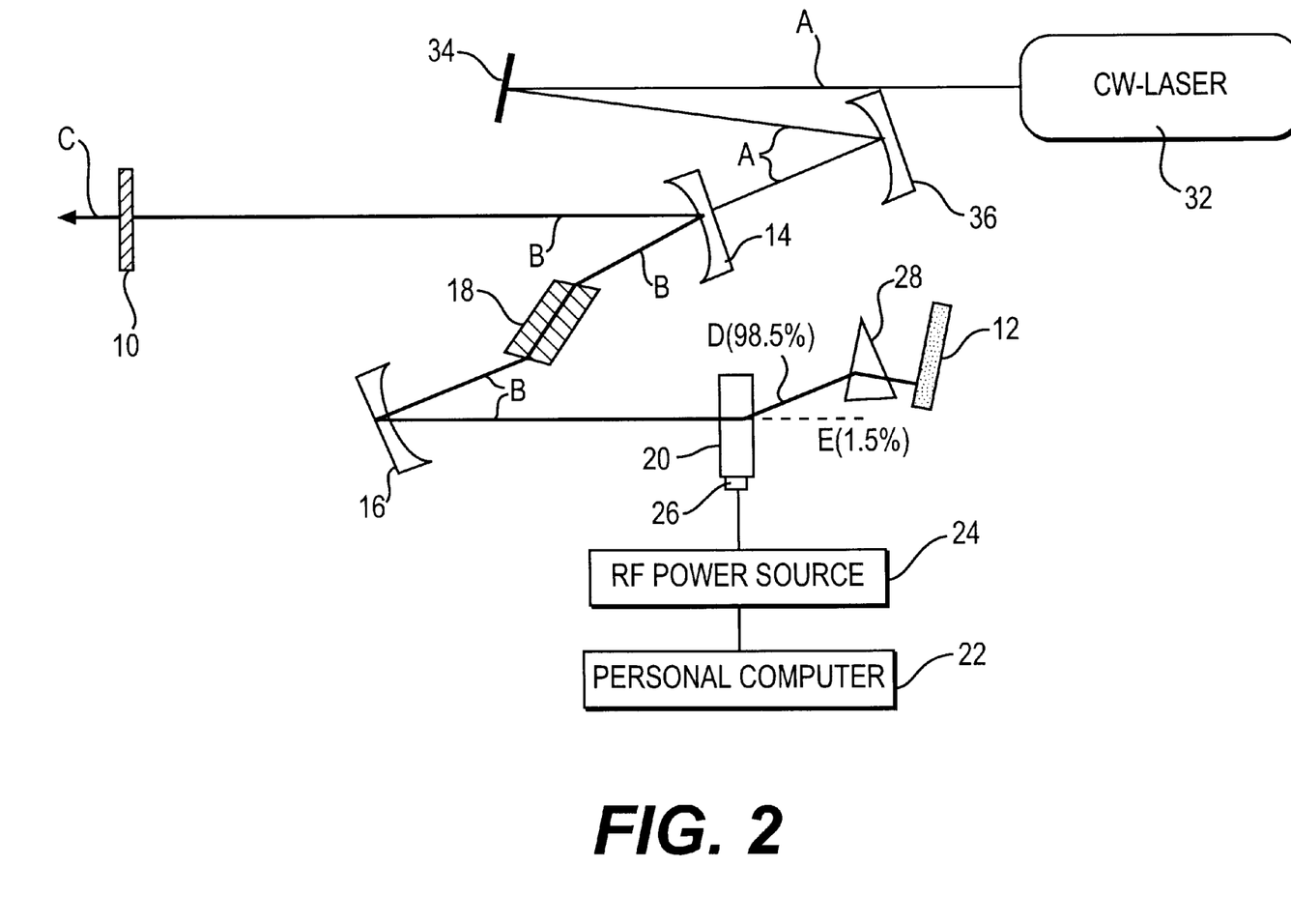
FIG. 2 is a schematic constitutional diagram for explaining a first manner of practice of the wavelength selectable laser oscillator in wavelength tunable laser according to the present invention.

Referring to FIG. 2, it is a schematic constitutional diagram for explaining the first manner of practice of the wavelength selectable laser oscillator in wavelength tunable laser according to the present invention.

In this wavelength selectable laser oscillator in wavelength tunable laser, a so-called Z-holding type laser resonator wherein an optical path of the light reciprocating inside the laser resonator exhibits a "Z"-shaped path is used. This laser resonator of Z-holding type is composed of a mirror having a prescribed transmittivity (for instance, the mirror reflects 98% of the light inputted, while transmits 2% thereof) on the outgoing side 10 and a total reflection mirror (100% reflection) 12.

Moreover, the laser resonator of Z-holding type is provided with a first intermediate mirror 14 to which is inputted excited laser beam A, besides which reflects totally the light B reciprocating between the mirror on the outgoing side 10 and the total reflection mirror 12 as well as with a second intermediate mirror 16 reflecting totally the light B reciprocating between the mirror on the outgoing side 10 and the total reflection mirror 12, and further the laser resonator is arranged in such that the optical path of the light B reciprocating inside the laser resonator exhibits a "Z"-shaped path.

Between the first intermediate mirror 14 and the second intermediate mirror 16 on the optical path of the laser resonator is disposed, as a wavelength tunable laser medium, a Ti:$Al_2O_3$ laser crystal 18 the incident end surface thereof for incident light has been Brewster-cut in such that the incident end surface is of a Brewster angle wherein reflection of the incident light becomes zero, so that laser oscillation is generated by coaxial excitation in the longitudinal direction due to excited laser beam A.

Furthermore, an acousto-optical crystal 20 being the one as a crystal for selecting wavelength and having birefringent property is disposed between the second intermediate mirror 16 and the total reflection mirror 12 on the optical path of the laser resonator.

In addition, to the acousto-optical crystal 20 is attached, as an acoustic wave inputting means, a piezoelectric element 26 driven by an RF power source 24 a frequency of which is controlled by a personal computer 22. Thus, when the piezoelectric element 26 is driven by the RF power source 24 wherein the frequency thereof has been set to a given value in accordance with the control of the personal computer 22 to thereby cause strain in the piezoelectric element 26, based on this strain of the piezoelectric element 26, acoustic wave having a frequency in response to the above described strain is inputted to the acousto-optical crystal 20. As a result, the acousto-optical crystal 20 diffracts only the light D in response to the acoustic wave inputted.

Accordingly, inputting of acoustic wave to the acousto-optical crystal 20 is controlled by the personal computer 22 in such a manner that only the light B having a wavelength of the outgoing laser beam C which is intended to be outputted from the mirror on the outgoing side 10 by means of the piezoelectric element 26 can be outputted as the diffracted light D which has been diffracted by the acousto-optical crystal 20 in a prescribed direction thereby being capable of making laser oscillation.

Furthermore, a dispersion correcting prism 28 for correcting dispersion of the diffracted light D is disposed between the acousto-optical crystal 20 and the total reflection mirror 12. By the use of the dispersion correcting prism 28, directivity of outgoing laser beam C can be kept constant.

In the wavelength selectable laser oscillator in wavelength tunable laser, a continuous-wave laser 32 is used as the laser for inputting excited light A to the laser resonator. As the continuous-wave laser 32, a continuous-wave solid state laser, a continuous-wave semiconductor laser, a continuous-laser Ar ion-laser (CW-Ar ion-laser) or the like may be specifically used.

Namely, in the case where LiSAF laser crystal, LiCAF laser crystal or the like is employed as a wavelength tunable laser medium in place of the Ti:Al$_2$O$_3$ laser crystal 18, second higher harmonics of a solid state laser like an Nd solid state laser such as Nd:YAG laser, Nd:YLF laser, Nd:YUO$_4$ laser and the like may be used as the CW-laser 32.

The excited laser light A produced by the CW-laser 32 is reflected to a total reflection beam-condensing mirror 36 by the total reflection mirror 34 to be collected by the total reflection beam-condensing mirror 36, and is inputted through the first intermediate mirror 14 so as to cause the Ti:Al$_2$O$_3$ 18 to effect coaxial excitation in the longitudinal direction.

In this case, to generate laser oscillation by means of continuous-wave laser beam having low power derived from the CW-laser 32 which is to be inputted to a laser resonator as the excited laser beam A, it is required to use an acousto-optical crystal 20 having diffraction efficiency, as high as possible, of diffracted light D outputted from the acousto-optical crystal 20.

In the above described arrangement, to obtain outgoing laser beam C, the Ti:Al$_2$O$_3$ laser crystal 18 is excited by utilizing the excited laser beam A inputted by the CW-laser 32. According to the principle described above, a frequency of the RF power source 24 is controlled by the personal computer 22 to stimulate the piezoelectric element 26 in response to a wavelength of the outgoing laser beam C which is desired to be outputted from the mirror on the outgoing side 10.

In the situation described above, the outgoing light having a wavelength in response to the frequency of the RF power source 24 among the outgoing light rays outputted from the Ti:Al$_2$O$_3$ laser crystal 18, which are derived from the one inputted to the acousto-optical crystal 20 and belonging to a wide range of wavelength zone, is diffracted in a prescribed direction to be outputted from the acousto-optical crystal 20 as the diffracted light D. Furthermore, the diffracted light D outputted from the acousto-optical crystal 20 in a diffracted state along a prescribed direction is inputted to the total reflection mirror 12 through the dispersion correcting prism 28, so that the light inputted is reflected by the total reflection mirror 12, whereby the resulting light reciprocates inside the laser resonator along the "Z"-shaped optical path.

As a result, only the light having a wavelength in response to a frequency of the RF power source 24 is amplified to generate laser oscillation, whereby only the outgoing laser beam C having the aforesaid wavelength can be outputted from the laser resonator.

As described above, selection for a wavelength of outgoing laser beam C can be realized in control of the personal computer 22 by selecting a frequency of the RF power source 24 to stimulate the piezoelectric element 26 by means of the RF power source 24. Accordingly, a rapid and random selection of a wavelength of the outgoing laser beam C is possible, so that a wavelength tuning speed of the outgoing laser beam can be elevated.

Moreover, since the dispersion correcting prism 28 is disposed, dispersion of a diffraction angle of the diffracted light D is corrected. If there is dispersion in a diffraction angle of the diffracted light D, an optical path of the light changes inside the laser resonator, whereby a wavelength tunable zone is limited. In this respect, however, when the dispersion correcting prism 28 is provided, the problem as described above can be eliminated. At the same time, fluctuations in the outgoing direction of the outgoing laser beam C caused while tuning wavelength can also be corrected.

In addition, the constitution of the laser resonator is constituted into Z-holding type, and it is arranged in such that the excited laser beam A is collected by the total reflection beam-condensing mirror 36 to input the same to the Ti:Al$_2$O$_3$ laser crystal 18. Hence, laser oscillation can be achieved even by the excited laser beam A of low powers such as from the high repetitive pulsed laser 32.

Figure 3:
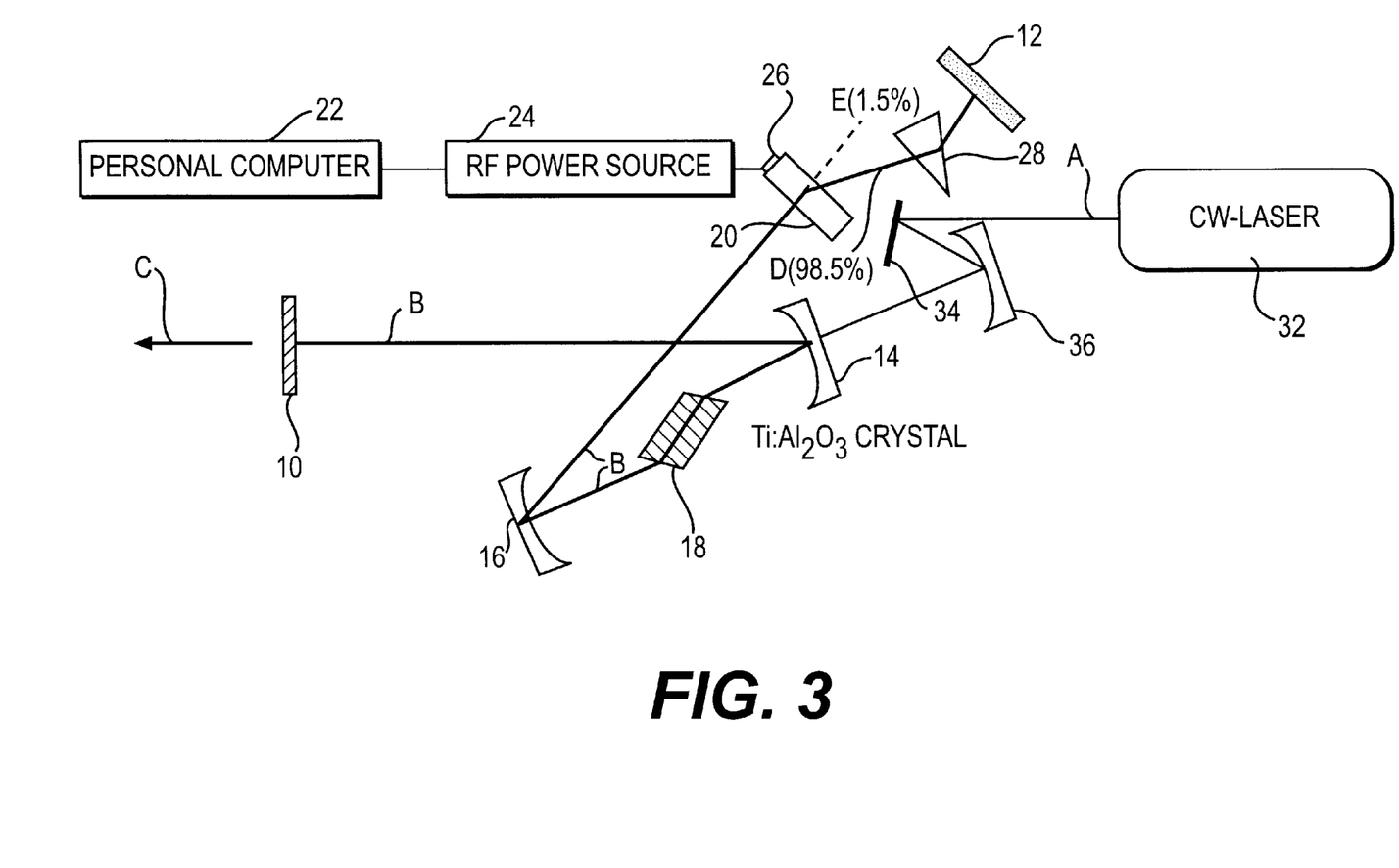
FIG. 3 is a schematic constitutional diagram for explaining a second manner of practice of the wavelength selectable laser oscillator in wavelength tunable laser according to the present invention.

FIG. 3 is a schematic constitutional diagram for explaining the second manner of practice of the wavelength selectable laser oscillator in wavelength tunable laser according to the present invention wherein the same reference characters designate the same or equivalent components as or to those of FIG. 2 showing the first manner of practice of the wavelength selectable laser oscillator in wavelength tunable laser according to the present invention, so that the detailed explanation therefore will be omitted.

The wavelength selectable laser oscillator in wavelength tunable laser of the second manner of practice differs only from that of the first manner of practice in the point that the constitution of the laser resonator is formed into a so-called X-holding type.

In also the laser resonator of X-holding type used in the wavelength selectable laser oscillator in wavelength tunable laser of the second manner of practice, since the excited laser beam A is collected by the total reflection beam-condensing mirror 36 to be inputted to the Ti:Al$_2$O$_3$ laser crystal 18, laser oscillation can be produced by even the excited laser beam A of low powers derived from the CW-laser 32.

In addition to the above, by the use of this laser resonator of X-holding type, the constitution thereof can be made more compact than that of a laser resonator of Z-holding type.

Figure 4:
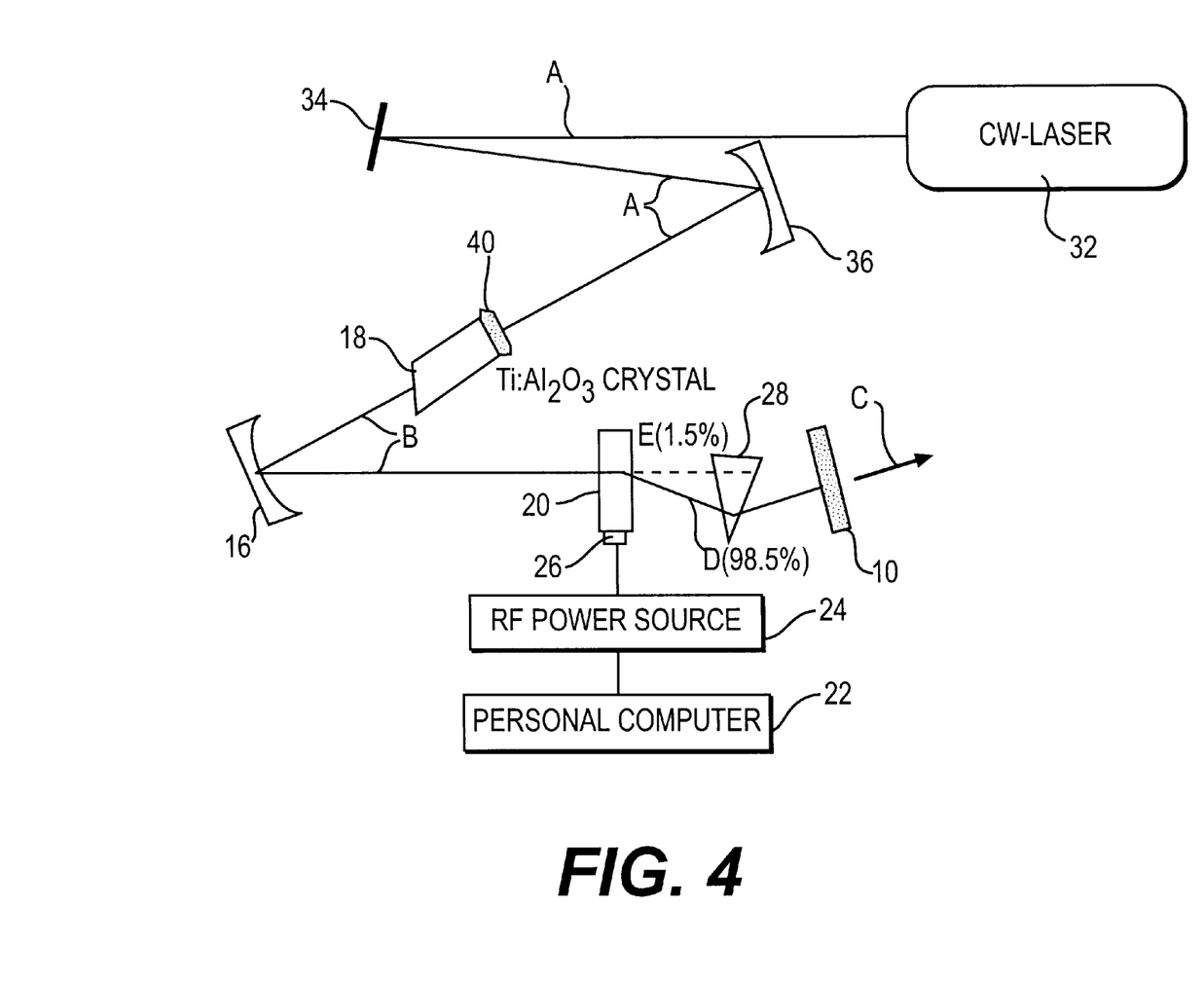
FIG. 4 is a schematic constitutional diagram for explaining a third manner of practice of the wavelength selectable laser oscillator in wavelength tunable laser according to the present invention.

FIG. 4 is a schematic constitutional diagram for explaining the third manner of practice of the wavelength selectable laser oscillator in wavelength tunable laser according to the present invention wherein the same reference characters designate the same or equivalent components as or to those of FIG. 2 showing the first manner of practice of the wavelength selectable laser oscillator in wavelength tunable laser according to the present invention, so that the detailed explanation therefore will be omitted.

The wavelength selectable laser oscillator in wavelength tunable laser of the third manner of practice differs only from that of the first manner of practice in the point that the total reflection mirror 12 of FIG. 1 is replaced by a mirror on the outgoing side 10, and at the same time, in place of removing the mirror on the outgoing side 10 and the first intermediate mirror 14 in FIG. 1, such an arrangement that excited laser beam A is inputted to the end surface of the Ti:Al$_2$O$_3$ laser crystal 18 on the side to which the excited laser beam A is inputted, besides a specular coating 40 for reflecting the light outputted from the Ti:Al$_2$O$_3$ laser crystal 18 is applied is added to the modification described herein.

Thus, in the wavelength selectable laser oscillator in wavelength tunable laser of the third manner of practice, a laser resonator is composed of the specular coating 40 and the mirror on the outgoing side 10.

For this reason, according to the wavelength selectable laser oscillator in wavelength tunable laser of the third manner of practice, the number of components in this third manner of practice can be reduced in comparison with that of the wavelength selectable laser oscillator in wavelength tunable laser of the first manner of practice as well as with that of the second manner of practice, whereby the whole system can be miniaturized, besides decrease in the cost therefore can be achieved.

Figure 5:
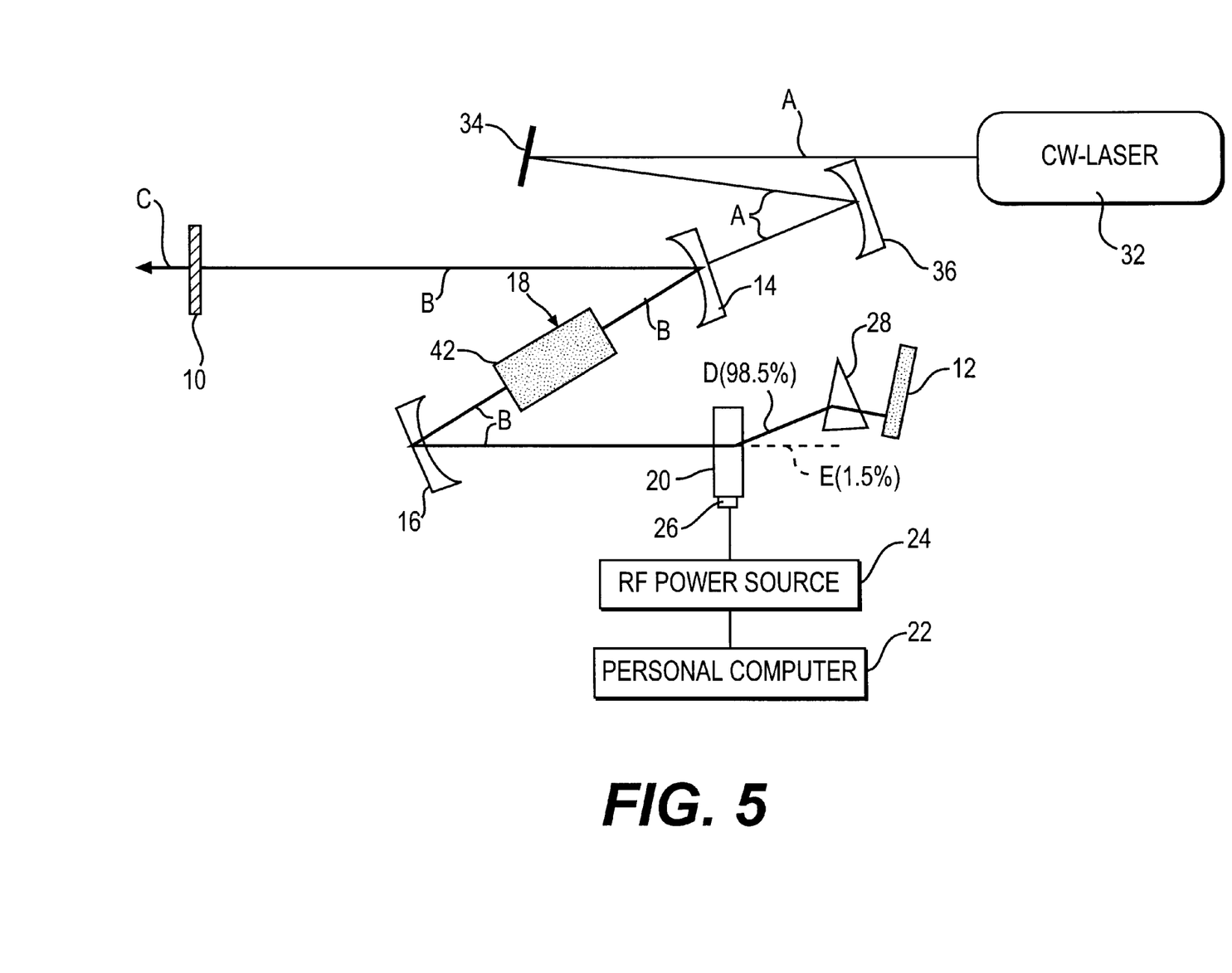
FIG. 5 is a schematic constitutional diagram for explaining a fourth manner of practice of the wavelength selectable laser oscillator in wavelength tunable laser according to the present invention.

FIG. 5 is a schematic constitutional diagram for explaining the fourth manner of practice of the wavelength selectable laser oscillator in wavelength tunable laser according to the present invention wherein the same reference characters designate the same or equivalent components as or to those of FIG. 2 showing the first manner of practice of the wavelength selectable laser oscillator in wavelength tunable laser according to the present invention, so that the detailed explanation therefore will be omitted.

The wavelength selectable laser oscillator in wavelength tunable laser of the fourth manner of practice differs from that of the first manner of practice in the point that not such an arrangement that a Ti:Al$_2$O$_3$ laser crystal 18 has been Brewster-cut, and the crystal is disposed at a Brewster angle is applied, but such an arrangement that the Ti:Al$_2$O$_3$ laser crystal 18 has been subjected to vertical incident-cutting, at the same time, a non-reflecting coating 42 has been applied, and the crystal is disposed in such that excited laser beam A is vertically inputted is applied.

As described above, setting of the disposition of the Ti:Al$_2$O$_3$ laser crystal 18 where the excited laser beam A is vertically inputted is easier than that of the Ti:Al$_2$O$_3$ crystal 18 where it is placed at the Brewster-angle, besides dispersion of the angle is small, so that a wide wavelength zone can be obtained.

Figure 6:
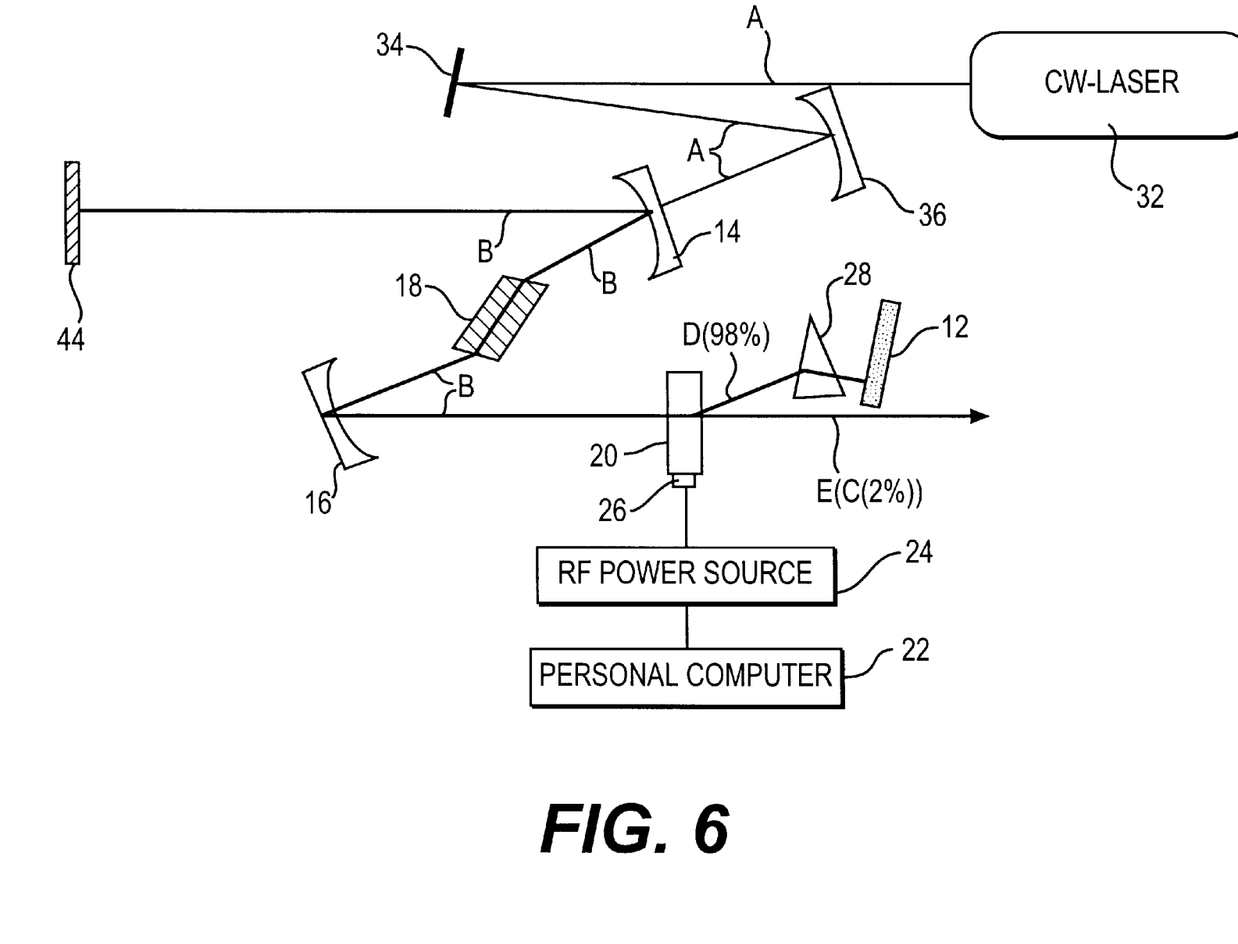
FIG. 6 is a schematic constitutional diagram for explaining a fifth manner of practice of the wavelength selectable laser oscillator in wavelength tunable laser according to the present invention.

FIG. 6 is a schematic constitutional diagram for explaining the fifth manner of practice of the wavelength selectable laser oscillator in wavelength tunable laser according to the present invention wherein the same reference characters designate the same or equivalent components as or to those of FIG. 2 showing the first manner of practice of the wavelength selectable laser oscillator in wavelength tunable laser according to the present invention, so that the detailed explanation therefore will be omitted.

The wavelength selectable laser oscillator in wavelength tunable laser of the fifth manner of practice differs from that of the first manner of practice in the point that the mirror on the outgoing side 10 in FIG. 2 is replaced by a total reflection mirror 44 exhibiting 100% reflection, and non-diffracted light E is adapted to be outputted as outgoing laser beam C.

According to the wavelength selectable laser oscillator in wavelength tunable laser of the fifth manner of practice, since a transparent mirror on the outgoing side 10 is not employed, loss in light due to the laser resonator can be reduced in comparison with the wavelength selectable laser oscillator in wavelength tunable laser of the first manner of practice, whereby it becomes possible to set a ratio of the diffracted light D and the non-diffracted light E outputted from the acousto-optical crystal 20 in such that, for example, the diffracted light D is 98%, while the non-diffracted light E is 2%, so that a ratio of the diffracted light D can be reduced. As a result, higher allowance in setting of the acousto-optical crystal 20 and the dispersion correcting prism 28 as well as in controlling the piezoelectric element 26 by means of the RF power source 24 wherein the personal computer 22 is utilized than that of the wavelength selectable laser oscillator in wavelength tunable laser of the first manner of practice can be obtained.

Since the present invention has been constituted as described above, the wavelength selectable laser oscillator in wavelength tunable laser of the present invention has such an excellent advantage that tuning of wavelength can be conducted at high speed while employing continuous-wave laser beam as the excited laser beam.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 8-132853 filed on Apr. 30, 1996 including specification, claims, drawings and summary are incorporated herein by reference in its entirety.

What is claimed is:

1. A wavelength selectable laser oscillator in a wavelength tunable laser comprising:

a laser resonator composed of opposed mirrors, one of the opposed mirrors on an outgoing side having a prescribed reflectivity and one of the opposed mirrors being a total reflection mirror which does not transmit light, but reflects light;

a wavelength tunable laser medium disposed in said laser resonator and capable of laser oscillation in a wavelength zone of a prescribed range;

an acousto-optical crystal disposed in said laser oscillator and to which is inputted outgoing light from said wavelength tunable laser medium;

an acoustic wave inputting means mounted on said acousto-optical crystal for inputting an acoustic wave to said acousto-optical crystal; and a continuous-wave laser for inputting an excited laser beam into said laser resonator, said acousto-optical crystal having birefringement properties, and said opposed mirrors of said laser resonator being arranged so as to reflect only a light component which is diffracted by said acousto-optical crystal in a specified direction during operation of said acousto-optical crystal, light outputted from said mirrors on the outgoing side being utilized as an outgoing laser beam from said laser resonator.

2. A wavelength selectable laser oscillator in a wavelength tunable laser comprising:
   a laser resonator composed of opposed total reflection mirrors, each mirror does not transmit light, but reflects light;
   a wavelength tunable laser medium disposed in said laser resonator and capable of laser oscillation in a wavelength zone of a prescribed range;
   an acousto-optical crystal disposed in said laser oscillator and to which is inputted outgoing light from said wavelength tunable laser medium;
   an acoustic wave inputting means mounted on said acousto optical crystal for inputting an acoustic wave to said acousto-optical crystal; and
   a continuous-wave laser for inputting an excited laser beam into said laser resonator, said acousto-optical crystal having birefringement properties, and said opposed total reflection mirrors of said laser resonator being arranged so as to reflect only a light component which is diffracted by said acousto-optical crystal in a specified direction during operation of said acousto-optical crystal, non-diffracted light outputted from said acousto-optical crystal being utilized as an outgoing laser beam from said laser resonator.

3. A wavelength selectable laser oscillator in wavelength tunable laser as claimed in claim 1 comprising further an optical element disposed in said laser resonator and for correcting dispersion of the diffracted light outputted from said acousto-optical crystal.

4. A wavelength selectable laser oscillator in wavelength tunable laser as claimed in claim 2 comprising further an optical element disposed in said laser resonator and for correcting dispersion of the diffracted light outputted from said acousto-optical crystal.

5. A wavelength selectable laser oscillator in wavelength tunable laser as claimed in claim 1 wherein s aid continuous-wave laser is a continuous-wave solid state laser.

6. A wavelength selectable laser oscillator in wavelength tunable laser as claimed in claim 2 wherein said continuous-wave laser is a continuous-wave solid state laser.

7. A wavelength selectable laser oscillator in wavelength tunable laser as claimed in claim 3 wherein said continuous-wave laser is a continuous-wave solid state laser.

8. A wavelength selectable laser oscillator in wavelength tunable laser as claimed in claim 4 wherein said continuous-wave laser is a continuous-wave solid state laser.

9. A wavelength selectable laser oscillator in wavelength tunable laser as claimed in claim 1 wherein said continuous-wave laser is a continuous-wave semiconductor laser.

10. A wavelength selectable laser oscillator in wavelength tunable laser as claimed in claim 2 wherein said continuous-wave laser is a continuous-wave semiconductor laser.

11. A wavelength selectable laser oscillator in wavelength tunable laser as claimed in claim 3 wherein said continuous-wave laser is a continuous-wave semiconductor laser.

12. A wavelength selectable laser oscillator in wavelength tunable laser as claimed in claim 4 wherein said continuous-wave laser is a continuous-wave semiconductor laser.

13. A wavelength selectable laser oscillator in wavelength tunable laser as claimed in claim 1 wherein said continuous-wave laser is a continuous-wave Ar ion-laser.

14. A wavelength selectable laser oscillator in wavelength tunable laser as claimed in claim 2 wherein said continuous-wave laser is a continuous-wave Ar ion-laser.

15. A wavelength selectable laser oscillator in wavelength tunable laser as claimed in claim 3 wherein said continuous-wave laser is a continuous-wave Ar ion-laser.

16. A wavelength selectable laser oscillator in wavelength tunable laser as claimed in claim 4 wherein said continuous-wave laser is a continuous-wave Ar ion-laser.

17. A wavelength selectable laser oscillator in wavelength tunable laser as claimed in claim 1 wherein said continuous-wave laser is second higher harmonics of a continuous-wave Nd solid state laser.

18. A wavelength selectable laser oscillator in wavelength tunable laser as claimed in claim 2 wherein said continuous-wave laser is second higher harmonics of a continuous-wave Nd solid state laser.

19. A wavelength selectable laser oscillator in wavelength tunable laser as claimed in claim 3 wherein said continuous-wave laser is second higher harmonics of a continuous-wave Nd solid state laser.

20. A wavelength selectable laser oscillator in wavelength tunable laser as claimed in claim 4 wherein said continuous-wave laser is second higher harmonics of a continuous-wave Nd solid state laser.

21. A wavelength selectable laser oscillator in wavelength tunable laser as claimed in claim 1 wherein said laser resonator is a Z-holding type laser resonator.

22. A wavelength selectable laser oscillator in wavelength tunable laser as claimed in claim 2 wherein said laser resonator is a Z-holding type laser resonator.

23. A wavelength selectable laser oscillator in wavelength tunable laser as claimed in claim 3 wherein said laser resonator is a Z-holding type laser resonator.

24. A wavelength selectable laser oscillator in wavelength tunable laser as claimed in claim 4 wherein said laser resonator is a Z-holding type laser resonator.

25. A wavelength selectable laser oscillator in wavelength tunable laser as claimed in claim 5 wherein said laser resonator is a Z-holding type laser resonator.

26. A wavelength selectable laser oscillator in wavelength tunable laser as claimed in claim 6 wherein said laser resonator is a Z-holding type laser resonator.

27. A wavelength selectable laser oscillator in wavelength tunable laser as claimed in claim 7 wherein said laser resonator is a Z-holding type laser resonator.

28. A wavelength selectable laser oscillator in wavelength tunable laser as claimed in claim 8 wherein said laser resonator is a Z-holding type laser resonator.

29. A wavelength selectable laser oscillator in wavelength tunable laser as claimed in claim 9 wherein said laser resonator is a Z-holding type laser resonator.

30. A wavelength selectable laser oscillator in wavelength tunable laser as claimed in claim 10 wherein said laser resonator is a Z-holding type laser resonator.

31. A wavelength selectable laser oscillator in wavelength tunable laser as claimed in claim 11 wherein said laser resonator is a Z-holding type laser resonator.

32. A wavelength selectable laser oscillator in wavelength tunable laser as claimed in claim 12 wherein said laser resonator is a Z-holding type laser resonator.

33. A wavelength selectable laser oscillator in wavelength tunable laser as claimed in claim 13 wherein said laser resonator is a Z-holding type laser resonator.

34. A wavelength selectable laser oscillator in wavelength tunable laser as claimed in claim 14 wherein said laser resonator is a Z-holding type laser resonator.

35. A wavelength selectable laser oscillator in wavelength tunable laser as claimed in claim 15 wherein said laser resonator is a Z-holding type laser resonator.

36. A wavelength selectable laser oscillator in wavelength tunable laser as claimed in claim 16 wherein said laser resonator is a Z-holding type laser resonator.

37. A wavelength selectable laser oscillator in wavelength tunable laser as claimed in claim 17 wherein said laser resonator is a Z-holding type laser resonator.

38. A wavelength selectable laser oscillator in wavelength tunable laser as claimed in claim 18 wherein said laser resonator is a Z-holding type laser resonator.

39. A wavelength selectable laser oscillator in wavelength tunable laser as claimed in claim 19 wherein said laser resonator is a Z-holding type laser resonator.

40. A wavelength selectable laser oscillator in wavelength tunable laser as claimed in claim 20 wherein said laser resonator is a Z-holding type laser resonator.

* * * * *